Feb. 25, 1958 R. C. BEITZ 2,824,972
SPECTROGRAPHIC APPARATUS
Filed April 20, 1953 2 Sheets-Sheet 1

INVENTOR
RICHARD C. BEITZ
BY
Louis L. Gagnon
Noble J. Williams
ATTORNEYS

Feb. 25, 1958

R. C. BEITZ 2,824,972

SPECTROGRAPHIC APPARATUS

Filed April 20, 1953

INVENTOR
RICHARD C. BEITZ

BY
Louis L. Gagnon
Noble S. Williams
ATTORNEYS

United States Patent Office 2,824,972
Patented Feb. 25, 1958

2,824,972

SPECTROGRAPHIC APPARATUS

Richard C. Beitz, Amherst, N. Y., assignor to American Optical Company, Southbridge, Mass., a voluntary association of Massachusetts Application April 20, 1953, Serial No. 349,712

15 Claims. (Cl. 250—83.3)

This invention relates to spectrographic apparatus for use in establishing an emission spectra and analyzing the spectral distribution of sources of radiant energy, and more particularly to spectrographic apparatus constructed and arranged to rapidly analyze and visually display upon a suitable viewing screen spectral distribution curves of radiant energies covering a wide spectral range including the visible and an appreciable part of the ultra-violet and the infra-red regions of the spectrum. By following the teachings of the present invention and using the proper electrical and optical components in combination in the manner about to be described, it is possible to establish a spectrum of a constant or rapidly changing source or sources of radiant energy emitting visible, or ultra-violet, or infra-red light or combinations thereof over a wide spectral range between approximately 2200 angstroms and 6½ microns and to visibly display a spectral energy distribution curve thereof upon a cathode ray tube, the curve being indicative of the wave lengths and relative intensities of the several components of the radiant energy being received. Means is also provided for displaying a wave length scale upon the screen adjacent and related to the distribution curve for all degrees of magnification of the curve being formed.

The spectrographic apparatus of the present invention comprises a combination of optical, mechanical and electrical means for receiving a wide range of radiant energy, for producing a spectrum thereof, for rapidly scanning this spectrum, for instantly producing an electrical signal which is of a strength bearing a definite relation to the spectral energy being received at any instant, and for visually representing these spectral energy components, whether they be constant or rapidly changing, against relative intensities as a spectral energy distribution curve upon a viewing screen. The apparatus is provided with suitable means whereby a photo-multiplier, or the like, may be employed as a signal detector when receiving spectral energy within a general wave length range from approximately 2200 A. to 6500 A. radiation. However, such detecting means which is suitable for this spectral range will be entirely inadequate in other spectral regions and for this reason, there is also provided additional photo-sensitive detecting means, such as photo-conductors to cover different ranges. Photo-conductors are known which have different detection ranges. For example, lead sulphide photo-conductors have been used successfully for detection within a region ranging between approximately 5500 A. and 2.8 microns. Lead selenide photo-conductors, on the other hand, are useful in a higher region ranging between approximately 7000 A. and 4.5 microns. For an even higher range, lead telluride detectors may be useful in a region between approximately 10,000 A. (1 micron) and 6½ microns.

Since the instrument of the present invention is intended to rapidly detect radiation from near emisssions point (such as a gas flame, an open hearth furnace, an exhaust of an internal combustion engine) or from more distant points (such as gun flashes, explosions, etc.), it will be obvious that a widely varying amount of energy will be available at different times for detection and analyzation purposes by the instrument. Sometimes more than enough radiation may be available for detection purposes while at other times all the energy which can be conveniently collected can be used advantageously for the detecting and displaying of the characteristics of the spectral energy being received.

It should be readily apparent, therefore, that it is most desirable in such a spectrographic instrument to provide either an entrance and an exit slit of variable width or a graduated series of normally fixed entrance and exit slits of different widths to control the amounts of energy entering the optical system of the instrument and which is to be detected by different selected ones of the above-mentioned detectors or equivalent means. On the one hand, large slit openings will admit much light energy, while on the other hand, when all the radiation desirable is available, higher optical resolution may be obtained by the use of a smaller entrance slit. This is because a narrower entrance slit will provide a more nearly perfectly formed spectrum in the optical system of the instrument and a narrower exit slit will pass more nearly monochromatic energy components to the photo-sensitive device. A single adjustable entrance slit and a single adjustable exit slit, however, would be most difficult to use satisfactorily in an instrument of the present invention wherein high amplifier gain and optical high resolution are required and, accordingly, it has been found more desirable and satisfactory to use graduated related series of entrance and exit slits arranged to function with an associated electrical system which is controllable to work therewith.

The electrical components for amplifying the output signal of photo-detecting devices of the present invention and for thereafter displaying a spectral energy curve upon the associated cathode ray viewing tube should have electrical response characteristics of sufficient band width values as to properly amplify over the frequency range required and without objectionable distortion and supply the cathode ray tube with the amplified signal. It is well known, however, in any electrical or electronics system, the amount of electrical noise in the system is directly proportional to the band width of the system and this must be taken into consideration for best functioning of the device.

It is, accordingly, desirable to have a signal amplifying system having a band width great enough, but no greater than that required, to accurately transmit the desired signal. In the instrument of the present invention the components are such that the time required for the signal amplifying system to respond completely to changes in the radiation incident upon the photo-detector of the system is chosen to agree with the time required for the spectral image of the entrance slit to be moved completely across the exit slit by the scanning mechanism of the device.

Since a number of pairs of slits of different widths are used, the same control which selects the slit pairs to be operative is arranged to vary the band width of the amplifier. Also since it is necessary, in order to cover the relatively wide spectral range mentioned above, to selectively employ both a photo-multiplier and one of several photo-conductors, it has been found desirable to use a high speed shutter or equivalent means of suitable design for blocking out a part of the radiant energy entering the optical system of the device during each separate operating cycle or scan of the spectrum and thereby establishing a "zero" reference line for each sweep of the spectral image being displayed as a spectral distribution curve upon the screen of the cathode ray tube.

The band width control mechanism employed to vary the high frequency cut-off of the amplifier is suitably linked to the slit-changing mechanism of the system, so that for any slit width the optimum signal-to-noise ratio will be selected. The narrowest band width which will permit complete electrical resolution of the smallest spectral detail resolved with a given slit width is the optimum. Approximately a 100 to 1 ratio of slit widths is provided in the instrument of the present invention wherein ten approximately equally varied steps have been used, and approximately the same ratio of amplifier band widths has been provided by means of suitable electrical components in the system.

Since a photo-conductor is inherently an A. C. detector and since it must be used in this application with a high gain amplifier, the zero radiation level of the data as displayed upon the cathode ray tube screen will not necessarily correspond to any particular point on the tube. Rather, the relationship between the "zero" signal level trace on the cathode ray tube screen and each and every point on any signal wave form displayed will be such that the area above the "zero-signal" trace on the screen and enclosed between the zero-signal trace and the radiation-formed trace will be the same as the area below the zero-signal trace and enclosed between the zero-signal trace and the radiation-formed trace.

Other objects and advantages of the invention will become apparent from the detailed description which follows when taken in conjunction with the accompanying drawing in which.

Figure 1:
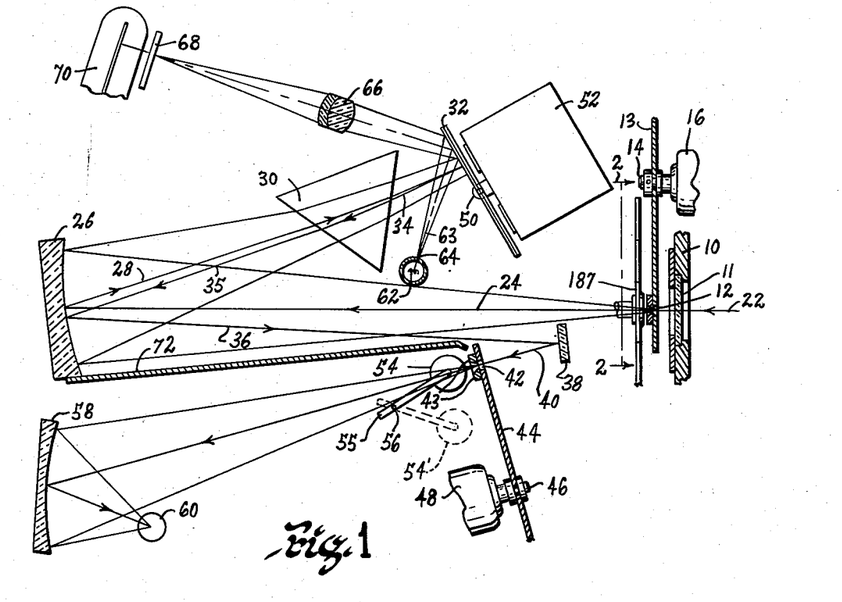
Fig. 1 is a diagrammatic showing of an optical system for use in a spectrographic instrument for carrying out the present invention.

Referring to the drawing in detail and particularly Fig. 1, it will be seen that an instrument embodying the present invention may comprise an exterior wall 10 having a window 11 formed of fluorite or other suitable radiation transmitting material. This window is positioned in front of an entrance slit 12. In the present embodiment supporting means for the means forming the slit has been constructed in the form of a circular disc 13 which is centrally carried by a rotatable shaft 14 of an electric motor 16. As better shown in Fig. 2, this disc is provided with a series of pairs of slit forming members 18, with each pair radially spaced equal amounts from the center of the shaft 14. Each member of each pair of members 18 may be adjusted a small amount in a radial direction toward and away from the other before the securing screws 18' are tightened, so that a graduated series of slit openings (in the present instance, 10 in number) will be provided for admitting different amounts of radiant energy to the optical system of the instrument.

Since the instrument is intended to operate not only in the visible but in parts of the infra-red and ultra-violet regions of the spectrum, including all wave lengths from approximately 2000 angstrom units to 6.5 microns, a complete outer casing (not shown except for wall 10) for the instrument would be provided. In this manner, dust, sudden temperature changes and the like may be excluded from the interior of the instrument while radiant energy from an external point, such as indicated by the arrow 22 traveling along the optical axis 24 of the instrument may pass through the window and through the particular entrance slit 12 selected and in alignment therewith.

In alignment with the selected entrance slit 12 and spaced at a suitable distance therefrom is a concave first surface reflecting objective 26, preferably of a parabolic curvature. While best results may be obtained by a mirror of this type, formed as an off-axis paraboloid, usable results could be had by employing a section of a spherical mirror, which of course would be appreciably less expensive. Light or energy traveling along the optical axis 24 in the direction indicated will be reflected by the objective 26 along the line 28 toward a fluorite dispersion prism 30, and from the prism 30 the dispersed light or energy travels toward a reflecting element 32, preferably a first surface mirror, medially set at a slight angle from true normal incidence so that this light reflected by the reflector 32 will be directed, as indicated by the line 34, back through the prism 30. Here the light or energy is again dispersed. The light is then directed toward the objective 26 as indicated by the line 35. The prism 30 as shown in the present embodiment is preferably a 60° fluoride prism. However, at certain times and under certain conditions, prisms of other optical material and of different dispersion angles may be employed.

This light received by the objective 26 is in turn directed, as indicated by the line 36 toward a small plane first surface mirror 38 which serves to "fold" the optical system, and from mirror 38 the light is directed along the line 40 to exit slit 42.

In a manner similar to that employed for the entrance slits 12, the exit slit 42 is one of a series (preferably ten) carried by a wall 44 and this wall is in the form of a circular disc mounted for rotation upon a shaft 46 of a motor 48. This disc is provided with a series of equally radially spaced openings and a pair of spaced adjustable members 43 overlying each opening so that an exit slit of a size corresponding to the size of the entrance slit may be employed when aligned with the optical axis of the system. The operation of the slits 12 and 42 will be more fully hereinafter described. The reflector 32 is supported intermediate its ends for pivotal movement about a point 50 and may be oscillated by an electric motor 52, which will be more fully discussed hereinafter.

Aligned and closely adjacent with the exit slit 42 which is in the operative position intersecting optical axis 40 is a light sensitive element, such as a photo-multiplier 54 or the like, for generating an electrical signal as radiant energy within the wave length range of 2200 A. to 6500 A. impinges thereon. The multiplier 54 is carried by an arm 55 mounted on a pivotal shaft 56 so that rotation of this shaft will serve to swing the multiplier to an out-of-the-way position 54' when a different detector is to be used. Also aligned with the exit slit 42 is a reflecting first surface condensing element 58, preferably an off axis ellipsoid, which receives the radiant energy passing through the operative exit slit 42 when the photo-multiplier 54 is out of alignment with the light passing therethrough. Light impinging upon the ellipsoid 58 is concentrated thereby onto a second light sensitive element 60, of the photo-conductor type, such as lead sulphide, lead selenide or lead telluride depending upon the particular wave length range which is to be analyzed.

When light entering the instrument passes as just described through the optical components thereof and impinges upon the reflector 32 while the reflector 32 is oscillating rapidly through a small angular displacement, the resulting spectral image formed by the prism 30 and focussed by the objective 26 substantially at the plane of the operative exit slit 42 will be caused to move rapidly relative to and across the exit slit. Since the spectral image at the exit slit 42 is of relatively large width in comparison to the width of the exit slit, successive wave lengths of the spectral image will be caused to pass through the slit and impinge upon the photo-multiplier 54 when same is in its operative position. Or if the photo-multiplier is out of alignment, the energy passing through the slit 42 will be collected by the reflector 58 which positioned so as to be focussed upon the slit and so as to have its conjugate image plane substantially at the photo-conductor 60.

It is also desirable, regardless of the horizontal sweep magnification of the trace of the radiant energy curve being provided upon the associated cathode ray viewing tube, to be able to tell fairly accurately the particular wave lengths being displayed at any time thereon. For this purpose, there is provided a relatively small light source 62 positioned in front of the oscillatable reflector 32 and to one side of the spectrum forming light beam being projected thereon. This light source 62 is arranged to direct a narrow beam of light outwardly through a pinhole 64 formed in an opaque outer wall of the light source 62 along an axis 63, so that this beam of light will be reflected angularly from an outer edge portion of the mirror 32 and will be directed along the line 65 towards an objective 66. The objective 66 serves to form an image of the pinhole aperture 64 substantially at the plane of a reticle 68 positioned in front of a photo-multiplier 70, or similar light sensitive element.

The reticle is preferably in the form of a transparent plate 68 having engraved, or photographed, or otherwise, disposed thereon an accurately formed pattern (not shown) formed by an appreciable number of side-by-side equal width opaque thin lines suitably spaced by equal clear areas or lines of like width and with every tenth opaque line omitted to represent an arbitrary wave length scale which may be calibrated to cover the range from 2000 A. to 6½ microns, and in accordance with the dispersion characteristics of the prism being used. Obviously, when the instrument is arranged to cover slightly different ranges, the scale of this reticle will be modified in size and range accordingly.

Since the mirror 32, as shown, is arranged to oscillate in the plane of the paper, or horizontally, the spectrum image at the exit slit 42 will be moving across the exit slit 42 in the same plane, and likewise the pinhole image 42 in the same plane, and likewise the pinhole image from the light source 62 will be moving across the reticle 68 substantially in this plane. For this reason, the photo-multiplier 70, positioned in back of the reticle 68, will have its cathode 70' horizontally disposed substantially in this plane so that the light from the pinhole will impinge upon some part of this cathode at all times and while passing through various parts of the reticle 68. As the pinhole image traverses the opaque division lines forming the reticle scale the amount of light being received by the cathode 70' will be varied.

In order that stray light will be excluded from the photo-sensitive elements 54 and 60, there is provided an opaque vertical partition 72 extending from adjacent the exit slit disc 44 to a location adjacent or beyond the objective 26.

If reference will be made to the electrical wiring diagram of Fig. 3, it will be seen that the light-sensitive element 54 is in the form of a photo-multiplier and is suitably connected to a power supply section of the instrument, generally indicated by the numeral 72. The power supply section embodies a transformer 74 having its primary 75 connection to a conventional source 76 of alternating current, such as a 60 cycle 115–125 volt line, preferably through the medium of a voltage regulator 78 of known construction. The power supply section 72 is arranged to supply two direct current voltages with respect to ground. The first of these D. C. voltages is taken from a point 80 of a diode rectifier 81 of conventional construction and consists of a negative potential of the order of 1500 volts with respect to ground; and the second D. C. potential is taken from a point 82 which is connected to a conventional double-diode inductance-capacitance filter combination 83 of conventional construction, and consists of a voltage of approximately 300 volts which is positive with respect to ground.

Figure 3:
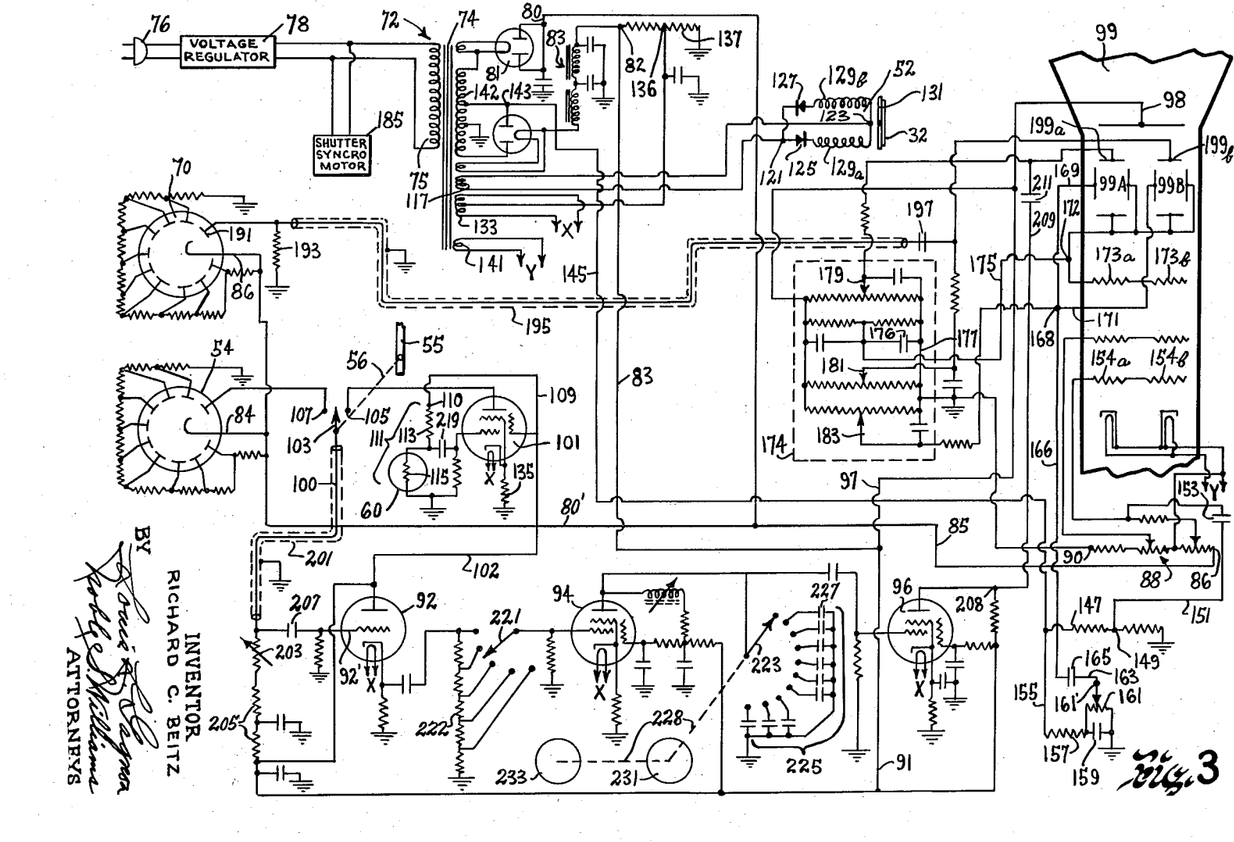
Fig. 3 is an electrical wiring diagram which may be used with the optical system of Fig. 1.

As may be seen from Fig. 3, the negative high voltage at point 80 is supplied to the cathode 84 of the main photo-multiplier 54 through a conductor 80', and to the cathode 86 of the secondary photo-multiplier 70 for the wave length reticle 68. This negative high voltage is also supplied to the lower end 86 of a conventional cathode ray tube voltage divider 88 by means of a conductor 85. The upper end 90 of this voltage divider 88 is connected to ground in conventional manner.

The positive high voltage at point 82, on the other hand, is supplied through conductor 83 to four different points namely: (a) through conductor 91 to the plate and screen grid circuits of all of the main amplifier tubes 92, 94 and 96; (b) through conductor 97 to the intensifier electrode 98 of a cathode ray tube 99 which in the present embodiment is of a two-gun type, in order that both a spectral energy distribution curve and a wave length curve may be simultaneously displayed upon the face or viewing screen thereof; (c) through conductor 100 to the plate of a preamplifier tube 101 when switch 103 is thrown to the right to contact terminal 105; and (d) through conductor 102 to the screen grid of this tube.

At this time, the main photo-multiplier 54 is in the position 54' shown by dotted lines in Fig. 1 and is accordingly inactive. When the switch 103 is thrown to the left to contact terminal 107, the positive high voltage of conductor 100 will be connected to the anode of the photo-multiplier 54. This action causes photo-multiplier 54, connected to the shaft 56 to which the switch 103 is also connected, to move into its full line position in back of the exit slit 42 as previously mentioned for receiving radiant energy passing through the slit. The positive high voltage applied to the screen grid of preamplifier 101 is also connected through conductor 109 to the top end 110 of a voltage divider 111 which jointly comprises a resistance 113 and a light sensitive photo-conductor cell 115. The bottom of this voltage divider is connected to ground as shown.

Power supply section 72 is provided with a low voltage transformer winding 117 for supplying alternating current to the oscillatable electric motor 52, previously mentioned, for driving the scanning mirror 32. As may be seen from the diagram of Fig. 3 when the instantaneous polarity of this low voltage alternating current is such that intermediate point 121 is positive with respect to point 123 rectifier 125 becomes conductive and rectifier 127 is non-conductive so that electromagnet 129a will be energized by the current passing therethrough. Electromagnet 129b at this time will remain inactive. Conversely, when the instant polarity at point 121 is negative with respect to 123, rectifier 127 will become conductive and 125 becomes nonconductive so that only electromagnet 129b will be energized. Centrally pivoted armature 131, which carries the scanning mirror 32, is so disposed with respect to electromagnets 129a and 129b that it will oscillate to and fro upon its pivot at a rate dependent upon the rate of frequency of the alternating current being supplied to the motor 52 and delivered by 117. In the instant application, a conventional 60 cycles current has been employed. Details of the motor construction are better shown in the recently issued Herr Patent No. 2,633,544.

A power transformer winding 133 delivers a low A. C. voltage to the filaments of the preamplifier tube 101, and the amplifier tubes 92, 94 and 96 as indicated by the terminals thereof marked X. In a high gain wide frequency amplifier system such as that being provided by tubes 101, 92, 94, and 96, great difficulty will ordinarily be experienced in eliminating unwanted 60 cycle line frequency signals from being superimposed upon the primary signal being supplied by the photo-conductor 115 to be used by the instrument. Such line frequency signals may, if care is not exercised, find their way into the input stage (tube 101) in a variety of ways, including unwanted electromagnetic and electrostatic coupling. Elimination of such unwanted coupling in this high gain amplifier system is done by adequate shielding and decoupling networks well known in electronic art.

When these unwanted electromagnetically and electrostatically coupled signals have been eliminated, another lower level line frequency signal may remain which originates in leakage of electrons from the filament or heater of the first stage preamplifier tube 101, presumably through the insulating material between said heater and the cathode of the tube. These stray electrons are conducted away from the cathode through the cathode impedance 135 which is connected to ground and the resulting 60 cycle electron flow, if not cared for, would appear as a 60 cycle signal superimposed upon the primary signal applied betwen control grid and ground of this tube.

In order to eliminate this unwanted secondary signal, the previously mentioned transformer winding 133 for the filament lines marked x has its center point provided with a small positive D. C. voltage (about 30 volts) with respect to ground. This voltage is obtained from a point 136 on a voltage divider network 137 which is connected between the previously mentioned positive high voltage supply point 82 and ground. This positive bias applied to the filaments for tubes 101, 92, 94 and 96 operates as follows: Electrons emitted from the filament of tube 101 and leaking through the dielectric material separating it from the cathode are, as they closely approach the cathode, repelled by the cathode which is at a D. C. potential negative with respect to these electrons. The electrons are, therefore, not collected by the cathode, and the unwanted 60 cycle secondary signal which might otherwise appear by virtue of the leakage electron current flowing through resistor 135 is eliminated. This removal of the secondary signal in a high gain amplifier, such as here being discussed (which is in the neighborhood of a gain of $10^6$ power) is exceedingly important.

A low voltage winding 141 of the power transformer 74 serves to supply an A. C. current to the heaters of the twin-gun cathode viewing tube 99.

An A. C. potential is taken from the high voltage winding 142 of the power transformer at 143. This A. C. voltage has a R. M. S. value of approximately 300 volts, and is fed through conductor 145 to the top of a voltage divider 147, the bottom of which connects to ground. An intermediate point 149 of this divider 147, at which the A. C. potential is approximately 30 volts with respect to ground, is connected through conductor 151 and coupling capacitor 153 to two control grids 154a and 154b of the two-gun cathode ray viewing tube 99. The purpose of this lower A. C. potential is to "blank out" the two viewing tube electron beams during a one-half cycle time interval when the mirror 32 carried by the armature 131 of the oscillatable motor 52 travels from one extreme position of deflection to the opposite extreme position thereof in a predetermined direction. During the opposite half cycle period the potential on the grids 154a and 154b permits these two electron beams to pass and to be rendered visible upon the face of the viewing tube 99.

This same high A. C. voltage is connected through conductor 155 to one side of a phase shifting network which consists of resistive impedance 157 and capacitive reactance 159 are so chosen as to shift the phase of the 60 cycle wave form applied between one end of this network and ground by approximately 90°. A potentiometer 161 which has a resistance very high in comparison to the 60 cycle reactance of 159, so as not to upset the 90° phase relationship obtained through the use of components 157 and 159, is connected across 159. Thus, it will be seen that a 60 cycle potential may be obtained between the ground side of the network and the sliding member 161' of the potentiometer which is proportional in amplitude to the position of said sliding member, and at a phase relationship fixed at 90° with respect to that of the potential applied to the control grids 154a and 154b through conductor 151 and coupling capacitor 153.

As may be seen from the wiring diagram of Fig. 3, this adjustable potential is applied through conductor 163, coupling capacitor 165 and conductor 166 to a common point 168. This point 168 is, in turn, connected by conductors 169 and 171 to the left hand horizontal deflecting plates of both electron guns 99A and 99B of the cathode ray tube 99. It will be seen that each right hand horizontal deflecting plate and one vertical deflecting plate of each gun are commonly connected, as are both second anodes 173a and 173b to a point 172 which is in turn connected through conductor 175 to a conventional cathode ray position control network, such as that shown enclosed in dotted rectangle 174, and then returned to ground through capacitor 176 (for A. C.) and conductor 177. The network enclosed within the dotted rectangle 174 is a D. C. pattern positioning network of conventional design having controls 179 for positioning the pattern of the left hand electron gun vertically upon the face of the viewing tube 99, control 181 for vertically positioning the pattern of the right hand electron gun of tube 99, and 183 for simultaneously horizontally positioning the patterns of both electron guns on the face of tube 99.

The purpose of the phase shift introduced by the network 157—159, and applied to the horizontal deflecting plates of both guns is as follows: the oscillating mirror motor assembly 52 for scanning the spectrum across exit slit 42, is a current sensitive device; that is extreme positions of the armature 131 correspond to maximum displacement of the current wave component of its 60 cycle circuit. This is due to the fact that the pull of the electromagnets 129a and 129b is proportional to the current passing through their windings. The amount of inductance and resistance in the circuit comprised by the oscillating mirror motor assembly 52 and winding 117 is such that the phase relationship of the current wave to the potential wave is 90°. Since the horizontal electrostatic deflecting system of tube 99 is sensitive to applied potential waves, the A. C. potential applied to the horizontal deflecting plates of both guns is shifted by the network 157—159 by 90° so that when the mirror carrying armature 131 has a maximum displacement to one side, both cathode ray tube beams are displaced a maximum toward one side of the viewing screen. When armature 131 is oppositely displaced, both viewing tube beams will be displaced a maximum amount toward the other side of the viewing screen.

Blanking potential obtained from intermediate point 149 on volatge divider 147 and applied to the two control grids 154a and 154b of tube 99 is such as to allow the two electron beams to impinge upon the viewing screen while moving from one side of the screen to the other, and to prevent such impingement when traveling in the opposite direction. Thus, the two forward traces of the beams are visible but the two return traces are invisible. It may be seen that the width of the pattern displayed horizontally on the tube 99 by both beams is determined by the seating of the arm 161' of the potentiometer 161.

A self-starting synchronous motor 185 is connected to the primary of power transformer 74 for operating a rotary shutter 187 shown near the entrance slit in Fig. 1. As better seen in Fig. 2, this shutter has a plurality of radially extending blades 188 for successively interrupting the light beam being transmitted through the entrance slit 12 of the optical system. As will presently appear, the parts are so constructed and arranged that these interruptions occur during small portions of each traverse of the two cathode ray beams (particularly the cathode ray beam displaying the light-intensity trace upon the viewing tube). The width of the blades of this rotary shutter are carefully proportioned relative to the clear space between blades so that the clear space 189 between the trailing and leading edges of the successive blades will provide a time interval of desired duration, and accordingly interrupt the light beam entering through entrance slit 12 for an interval slightly less than the duration of the cathode ray sweep in a forward direction upon the fluorescent screen of viewing tube 99.

Figures 2, 4:
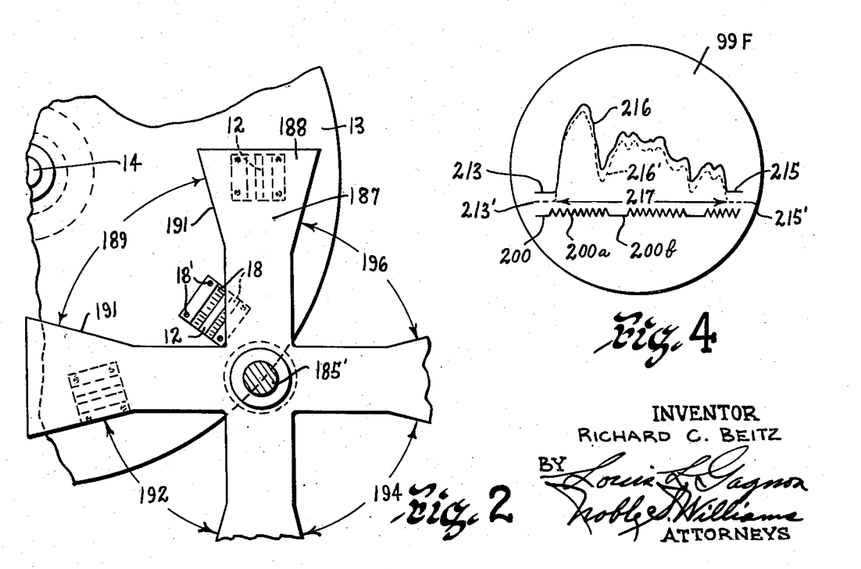
Fig. 2 is a partial sectional view taken substantially upon section line 2—2 of Fig. 1.
Fig. 4 is a view of the viewing screen of a cathode ray tube displaying optical distribution and wave length curves thereon.

The number of blades employed by the synchronous shutter 188 will be in accordance with the speed of the synchronous motor employed for operating same. In the instant application it has been found desirable to use a motor having a synchronous speed of 1800 R. P. M. and having mounted upon the shaft 185' thereof a shutter provided with four shutter blades. When the motor 185 rotates the shutter wheel to any one of its four positions where one of the blades thereof blocks the radiation through entrance slit 12, the mirror carrying armature 131 of the scanning motor assembly 52 will be near its extreme excursion in one direction. And as the mirror returns from this extreme position, traveling in the opposite direction, motor 185 rotates the shutter blade which has been blocking the radiation further so that it no longer covers slit 12. Thereafter, as the armature 131 approaches its opposite extreme excursion, the leading edge of the next successive blade on the shutter wheel will approach and cover slit 12 and will again block the radiation which would otherwise pass through the optical system. Thus, when the shutter wheel 187 and motor 185 are properly positioned relative to the slit 12, the times during which radiation may not pass through the optical system due to the action of the shutter blades 188 correspond to short periods when the two electron beams upon the viewing screen are near their extreme positions. The shutter 187 must be carefully and correctly angularly positioned upon the shaft 185' of the motor 185 to have the light passing through entrance slit 12 block the light at periods closely adjacent the opposite excursions of the oscillating mirror 32.

It follows, therefore, that while energy will be transmitted between each successive pair of adjacent blades, as for example through clear space 189, 192, 194 and 196 of the four bladed shutter of Fig. 2 as it rotates, only the energy passing through diametrically opposite openings 189 and 194, or 192 and 196, as the case may be, will be effective in producing a display upon the viewing tube 99. This is because the blanking of the tube, previously referred to, will occur during the time intervals when one of these pairs of opposed openings is transmitting. The reason for the use of a four bladed shutter with an 1800 R. P. M. synchronous motor operating on a 60 cycle A. C. current is that such a motor obviously can start in any one of four different relations 90° apart with respect to the frequency of the line current. Of course, other synchronous speeds may be employed for the motor 185 but in such cases a rotary shutter with a suitable number of blades and with suitable spacing between blades would be employed in order that a "zero" reference line may be established near opposite ends of each horizontal light intensity trace or sweep upon the face of the viewing tube.

As previously mentioned, the optical system in Fig. 1 includes a light source 62 having a pinhole 64 which is imaged after reflection from mirror 32 by objective lens 66 upon reticle 68. Reticle 68, as previously stated, is provided with a carefully graduated pattern formed by vertical opaque lines and these lines are arranged in such a way that as mirror 32 moves through its operating cycle, the image of pinhole 64 upon reticle 68 will move to and fro and light from this image will be alternately transmitted and obstructed as the pinhole image moves across the pattern. This intermittent light causes a correspondingly intermittent photo-electric current to be generated by the sensitive element of the photo-multiplier tube 70.

After amplification by the photo-multiplier, this varying electrical signal is applied to the anode 191 of the photo-multiplier 70 and through a load resistor 193 to ground. The varying potential produced across this load resistor is applied through shielded coaxial cable 195 and coupling condenser 197 to the vertical deflecting plates 199b of one of the two electron guns of viewing tube 99 (hereinafter referred to as the wavelength scale gun 99B). The resulting electrical signal is displayed upon a lower section of the face of the tube 99 (see Fig. 4) as a horizontal trace or line 200 having a plurality of small vertical peaks 200a, each of which corresponds to the blocking out effect of the pinhole light by an opaque line upon reticle 68. This trace thus constitutes the wave length scale for the instrument and for convenience the scale may be separated into decimal units by making each tenth line of double width or by omitting each tenth line, thereby creating horizontal portions 200b in the trace between each series of peaks.

When manually controllable switch 103 is in a position to contact terminal 107 and photo-multiplier 54 is in the solid lines position shown in Fig. 1, the useable signal of the photo-multiplier 54 is transmitted through conductor 100 in the grounded coaxial cable 201 to a load impedance comprising a peaking coil 203 and a resistance 205. The signal drop across this impedance is applied through a capacitor 207 to the input of the three stage broad band amplifier comprised by tubes 92, 94, and 96. The output signal of this three stage amplifier taken from point 208 is transmitted through conductor 209 and coupling capacitor 211 to the vertical deflection plate 199a of the electron gun 99A of tube 99, hereinafter referred to as the light intensity or spectrum gun.

It will be seen that as mirror 32 is moved by its armature 131 through its operating cycle and the radiation entering through slit 12 and dispersed into its various components of varying wave lengths by prism 34 traverses the optical system and impinges upon the photo-multiplier 54, the variations in intensity of such radiation will be transformed into an electrical signal of varying potential which, after amplification, will deflect the electron beam of gun 99A various amounts vertically upon the face or viewing screen 99F (see Fig. 4) of the tube 99. Since horizontal motion of the light intensity beam is tied directly to the angular motion of the scanning mirror 32, the result will be a plotting of relative intensities vertically against wave lengths horizontally.

The "zero" intensity level of points of this light intensity wave length plot will be shown by the ends of the trace displayed upon the tube as indicated by numerals 213 and 215. These "zero level" end portions of the plot or curve are established since at these times adjacent blades 188 of the synchronous shutter 187 cover the entrance slit 12 of the optical system and reduce the light energy in the optical system to zero. During the interval when the space 189 between adjacent shutter blades is in front of the slit 12 radiation is transmitted through the optical system and this interval is indicated upon the tube face 99F by numeral 217. During this same interval when the light inensities are being plotted, as indicated by irregular curve 216, the image of pinhole 64 will be moved across the reticle 68 so that the wave length scale 200 will be plotted by gun 99B of tube 99 simultaneously.

When manually controllable switch 103 is moved to a position to engage contact 105 the photo-multiplifier tube 54 will be moved to its inoperative dotted line position 54'. At this time collecting mirror 58 will direct the light passing through exit slit 42 onto the photoconductor 60. By turning switch 103 to engage contact 105 preamplifier tube 101 and its associated components will be connected to the three stage amplifier so that peaking coil 203 and load resistance 205 will be in series with the plate circuit of tube 101. The A. C. signal generated by this peaking coil and appearing in the plate circuit of the tube 101 is thus applied through capacitor 207 to the grid 92' of the three stage amplifier comprising tubes 92, 94, and 96. The amplified signal from photo-conductor 60 will then be displayed by tube 99. Variations in the light intensity in radiation reading the photo-sensitive element 115 of photo-conductor 60 operate upon this element in such a way as to change its resistance in step with changes in the radiation intensity. The varying potential due to this changing resistance of element 115 is applied through capacitor 219 to the grid of preamplifier tube 101. From this tube the signal is passed on through the remainder of the three stage amplifier to the light intensity or spectrum gun 99A of tube 99. Since the photoconductor element 115, whether it be lead sulphide, lead selenide, lead telluride or the like, is always electrically conducting during use and is used with such a high gain amplifier system, the position of the curve 216 being plotted relative to its "zero" radiation level (213 and 215) must be established even though at times these lines being plotted occur at various different levels upon the face 99F of the tube as indicated by dotted line 216'. It is for this reason that the shutter 187 is provided and synchronized with the sweep. Thus a "zero" reference line will always be indicated, such as indicated at 213' and 215'.

Tube 92 is a conventional cathode follower utilized as a gain control tube so that overall amplifier gain therefrom may be varied in five steps by gain control switch 221 connected to a stepped load resistor 222, to give approximately a 6 decibel gain per step, without affecting the frequency response characteristics of the amplifier. Tube 94 is utilized, as are tubes 96 and 101, as high gain broad band amplifier stages. In Fig. 3 there is indicated a switch 223 connected to the plate circuit of tube 94 and a series of associated capacitors 225 is controlled thereby. The function of this switch 223 is to connect any one of these capacitors, which are of various different electrical sizes, across the output circuit of tube 94 so that the high frequency cut-off of tube 94 (and consequently the high frequency response characteristics of the three stage amplifier as a whole) will depend directly upon the particular output shunt condenser being used.

As previously explained, the optimum bandwidth of the amplifier being used depends upon the widths of the entrance and exit slits in use. The narrowest bandwidth which will permit complete electrical resolution of the smallest spectral detail resolved with a given slit width is the optimum, since it provides the greatest signal-to-noise ratio. When switch 223 is in its first position (as shown in Fig. 3) the output capacitance of the plate circuit of tube 94 is the incidental capacitance of the wiring employed and the internal capacitance of tube 94. The amplifier as a whole is so designed that the bandwidth with the switch 223 in this first position is the optimum for use of the finest slit opening for both entrance and exit slits 12 and 42 respectively. When switch 223 is in its next or number two position, the value of the capacitor 227 of the series is such that the high frequency response of the amplifier is reduced to be the optimum for use with the next smaller slit size for both entrance and exit slits. Likewise, for each successive position of switch 223, the values of the successive capacitors connected across the output of tube 94 increase in such a way as to successively reduce high frequency response of the amplifier 94 to correspond to optimum response values for the successively increasing width of the slits. It should be kept in mind, of course, that the time constant for the mechanical parts of the device is the time required for a monochromatic radiation of the spectral image of the entrance slit 12 to be moved completely across the exit slit 42. On the other hand, the preferred time constant for the amplifier system is the shortest time in which the electrical signal being transmitted can undergo a complete change. And the best optical time constant for the system would be the longest time constant which could be used for the optical system. For best results, they should all work together.

In actual practice, it has been found desirable to interconnect the positioning of switch 223 with the positioning of the discs 13 and 44 carrying the entrance and exit slits 12 and 42, respectively. This may be done by a mechanical linkage or an electrical linkage. In Fig. 3 there is indicated by dotted lines at 228 means for connecting an electrical servo system comprising a first control motor 231 and a second control motor 233 of known type to the control of switch 223; the first motor being electrically connected to and controlling entrance slit motor 16 and the second motor being connected to and controlling exit slit motor 48. It should be noted that the edges 191 of the shutter wheel 187 are radially directed and that they are substantially parallel to the entrance slit 12 which is transmitting as they successively cross the slit. This is desirable in order that any "hunting" effect on the part of the servo motor 16 or 48 relative to control motor 231 or 233 will have substantially no significant influence on the trace being obtained.

Thus, when an instrument of the type described is placed in service, it will be possible to display upon the face 99F of the viewing tube 99, a spectrum curve or light intensity curve of relative intensities having "zero" reference levels always available at opposed ends the curve notwithstanding the particular horizontal magnification provided this curve or vertical positioning thereof, and it will be possible to simultaneously display upon this viewing tube a relative wave length scale accurately vertically positioned with reference to the spectrum curve. Of course, the wave length scale could be vertically beneath, above or even superimposed upon the light intensity curve, by adjusting control 179 relative to control 181, but the first arrangement (see Fig. 4) is preferred. By the suitable selection of slit widths and amplifier bandwidths radiations of not only low and high intensity sources, but from near or distant locations, and of various selected radiations from different portions of the spectrum, including regions in the ultra-violet and the infrared may be received and interpreted. The mirror motor scan will ordinarily cover about one-fourth of the total spectral range. The motor assembly 52, however, may be bodily pivoted small angular amounts when different regions of the spectrum from 2000 A. to 6½ microns are to be scanned.

Since the instrument of this invention is primarily intended for use in the displaying of and study of relative wave lengths against relative intensities for rapidly changing energy sources (or energy sources of short duration), the wave length scale at 200 is an arbitrary scale. For best results during use of the instrument, the wave length scale should be "calibrated" against a wave length curve having known "check points." The spectrum provided by an absorption of a didymium filter used with a 2870° K. incandescent bulb before the window 11 will provide several check points between 4000 A. and 2.7 microns.

Having described the invention, I claim:

1. Spectrographic apparatus for displaying substantially instantaneous changes in the spectral distribution characteristics of radiant energy coming from a radiant energy source to be analyzed, said apparatus comprising a normally stationary entrance slit for admitting said radiant energy to be analyzed to said apparatus, stationary means for forming a spectrum of said energy, a normally stationary exit slit, oscillating means for repeatedly moving said spectrum in a given direction across said exit slit substantially at a relatively large predetermined number of times per second, electrical means including a photosensitive element operatively positioned to receive the portion of said radiant energy passing through said exit slit and to provide an electrical signal which varies in strength in accordance with the amount of radiant energy being received thereby, a cathode ray tube having a viewing screen and means for projecting two electron beams simultaneously thereon, means for repeatedly deflecting both of said electron beams in a first direction upon said screen substantially in predetermined phase relation to the movement of said spectrum in said given direction, means for simultaneously deflecting one of said electron beams in a different predetermined direction upon said screen in accordance with the varying strength of said electrical signal, means for deflecting the other of said electron beams a preselected amount in said different predetermined direction upon said viewing screen each time said spectrum is moved predetermined fractional amounts of its total movement in said given direction across said exit slit, and rapidly operating opaque means positioned in said apparatus so as to periodically prevent the transmission of radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity will be displayed upon said viewing screen and a comparison wave length scale will be displayed adjacent thereto.

2. Spectrographic apparatus for displaying substantially instantaneous changes in the spectral distribution characteristics of radiant energy coming from a radiant energy source to be analyzed, said apparatus comprising a plurality of entrance slits of different predetermined widths, movable supporting means for selectively positioning any one of said entrance slits in an operative position for admitting said radiant energy to be analyzed to said apparatus, stationary means for forming a spectrum of said energy, a normally stationary exit slit, oscillating means for repeatedly moving said spectrum in a given direction across said exit slit substantially at a relatively large predetermined number of times per second, electrical means including a photosensitive element operatively positioned to receive the portion of said radiant energy passing through said exit slit and to provide an electrical signal which varies in strength in accordance with the amount of radiant energy being received thereby, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said electrical signal, and rapidly operating opaque means positioned in said apparatus adjacent one of said entrance and exit slits in the operative position thereof and having a leading edge arranged to move across said adjacent slit with said leading edge disposed in substantially parallel relation thereto for periodically preventing the transmission of radiant energy to said photosensitive element in predetermined phase relation to said movement of said spectrum across said exit slit, whereby a luminous trace indicative of the relative intensities of different wave lengths of the radiant energy entering said apparatus relative to a zero intensity will be provided upon said viewing screen.

3. Spectrographic apparatus for displaying substantially instantaneous changes in the spectral distribution characteristics of radiant energy coming from a radiant energy source to be analyzed, said apparatus comprising a plurality of entrance slits of different predetermined widths, movable supporting means for selectively positioning any one of said entrance slits in an operative position for admitting said radiant energy to be analyzed to said apparatus, stationary means for forming a spectrum of said energy, an exit slit, oscillating means for repeatedly moving said spectrum in a given direction across said exit slit substantially at a relatively large predetermined number of times per second, electrical means including a photosensitive element operatively positioned to receive the portion of said radiant energy passing through said exit slit, amplifying means for providing an amplified electrical signal which varies in strength in accordance with the amount of radiant energy being received by said element, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, and adjustable electrical means operatively connected to said supporting means for said entrance slits for varying in a series of steps the band width of said amplifying means in accordance with the particular entrance slit located in said operative position, whereby a luminous trace indicative of the relative intensities of different wave lengths of the spectrum of the radiant energy entering said apparatus at high resolution in accordance with the entrance slit being employed will be provided upon said viewing screen.

4. Spectrographic apparatus for displaying substantially instantaneous changes in the spectral distribution characteristics of radiant energy coming from a radiant energy source to be analyzed, said apparatus comprising a normally stationary entrance slit for admitting said radiant energy to be analyzed to said apparatus, stationary means for forming a spectrum of said energy, a plurality of exit slits of different predetermined widths, movable supporting means for selectively positioning any one of said exit slits in an operative position, oscillating means for repeatedly moving said spectrum in a given direction across the exit slit disposed in said operative position substantially at a relatively large predetermined number of times per second, electrical means including a photosensitive element operatively positioned to receive the portion of the radiant energy passing through the exit slit in said operative position, amplifying means providing an amplified electrical signal which varies in strength in accordance with the amount of radiant energy being received by said element, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, and adjustable electrical means operatively connected to said supporting means for said exit slits for varying in a series of steps the band width of said amplifying means in accordance with the particular exit slit located in said operative position, whereby a luminous trace indicative of the relative intensities of different wave lengths of the spectrum of the radiant energy entering said apparatus at high resolution in accordance with the exit slit being employed will be provided upon said viewing screen.

5. Spectrographic apparatus for displaying substantially instantaneous changes in the spectral distribution characteristics of radiant energy coming from a radiant energy source to be analyzed, said apparatus comprising a plurality of entrance slits of different predetermined widths, first movable supporting means for selectively positioning any one of said entrance slits in an operative position for admitting said radiant energy to be analyzed to said apparatus, stationary means for forming a spectrum of said energy, a plurality of exit slits of different predetermined widths, second movable supporting means for selectively positioning any one of said exit slits in a second operative position, oscillating means for repeatedly moving said spectrum in a given direction across the exit slit disposed in said second operative position substantially at a relatively large predetermined number of times per second, electrical means including a photosensitive element operatively positioned to receive the portion of said radiant energy passing through the exit slit in said second operative position, amplifying means for providing an amplified electrical signal which varies in strength in accordance with the amount of radiant energy being received by said element, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, adjustable electrical means operatively connected to said first and second supporting means for varying in a series of steps the band width of said amplifying means in accordance with the particular combination of entrance and exit slits located in said first and second operative positions respectively, whereby a luminous trace indicative of the relative intensities of different wave lengths of the spectrum of the radiant energy entering said apparatus at high resolution in accordance with the selected combination of slits being employed will be provided upon said viewing screen.

6. Spectrographic apparatus for displaying substantially instantaneous changes in the spectral distribution characteristics of radiant energy coming from a radiant energy source to be analyzed, said apparatus comprising a plurality of entrance slits of different predetermined widths, movable supporting means for selectively positioning any one of said entrance slits in an operative position for admitting said radiant energy to be analyzed to said apparatus, stationary means for forming a spectrum of said energy, an exit slit, oscillating means for repeatedly moving said spectrum in a given direction across said exit slit substantially at a relatively large predetermined number of times per second, electrical means including a photosensitive element operatively positioned to receive the portion of said radiant energy passing through said exit slit, amplifying means for providing an amplified electrical signal which varies in strength in accordance with the amount of radiant energy being received by said element, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, adjustable electrical means operatively connected to said supporting means for said entrance slits for varying in a series of steps the band width of said amplifying means in accordance with the particular entrance slit located in said operative position, and rapidly operating opaque means positioned in said apparatus so as to periodically prevent the transmission of said radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity at high resolution in accordance with the entrance slit being employed will be provided upon said viewing screen.

7. Spectrographic apparatus for displaying substantially instantaneous changes in the spectral distribution characteristics of radiant energy coming from a radiant energy source to be analyzed, said apparatus comprising a normally stationary entrance slit for admitting said radiant energy to be analyzed to said apparatus, stationary means for forming a spectrum of said energy, a plurality of exit slits of different predetermined widths, movable supporting means for selectively positioning any one of said exit slits in an operative position, oscillating means for repeatedly moving said spectrum in a given direction across the exit slit disposed in said operative position substantially at a relatively large predetermined number of times per second, electrical means including a photosensitive element operatively positioned to receive the portion of said radiant energy passing through the exit slit in said operative position, amplifying means providing an amplified electrical signal which varies in strength in accordance with the amount of radiant energy being received by said element, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, adjustable electrical means operatively connected to said supporting means for said exit slits for varying in a series of steps the band width of said amplifying means in accordance with the particular exit slit located in said operative position, and rapidly operating opaque means positioned in said apparatus so as to periodically prevent the transmission of said radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity at high resolution in accordance with the exit slit being employed will be provided upon said viewing screen.

8. Spectrographic apparatus for displaying substantially instantaneous changes in the spectral distribution characteristics of radiant energy coming from a radiant energy source to be analyzed, said apparatus comprising a plurality of entrance slits of different predetermined widths, first movable supporting means for selectively positioning any one of said entrance slits in an operative position for admitting said radiant energy to be analyzed to said apparatus, stationary means for forming a spectrum of said energy, a plurality of exit slits of different predetermined widths, second movable supporting means for selectively positioning any one of said exit slits in a second operative position, oscillating means for repeatedly moving said spectrum in a given direction across the exit slit disposed in said second operative position substantially at a relatively large predetermined number of times per second, electrical means including a photosensitive element operatively positioned to receive the portion of said radiant energy passing through the exit slit in said second operative position, amplifying means for providing an amplified electrical signal which varies in strength in accordance with the amount of radiant energy being received by said element, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, adjustable electrical means operatively connected to said first and second supporting means for varying in a series of steps the band width of said amplifying means in accordance with the particular combination of entrance and exit slits located in said first and second operative positions respectively, and rapidly operating opaque means positioned in said apparatus so as to periodically prevent the transmission of said radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity at high resolution in accordance with the selected combination of slits being employed will be provided upon said viewing screen.

9. Spectrographic apparatus for displaying substantially instantaneous changes in the spectral distribution characteristics of radiant energy coming from a radiant energy source to be analyzed, said apparatus comprising a plurality of entrance slits of different predetermined widths, movable supporting means for selectively positioning any one of said entrance slits in an operative position for admitting said radiant energy to be analyzed to said apparatus, stationary means for forming a spectrum of said energy, an exit slit, oscillating means for repeatedly moving said spectrum across said exit slit substantially at a relatively large predetermined number of times per second, electrical means including a photosensitive element operatively positioned to receive the portion of said radiant energy passing through said exit slit, amplifying means for providing an amplified electrical signal which varies in strength in accordance with the amount of radiant energy being received by said element, a cathode ray tube having a viewing screen and means for projecting two electron beams simultaneously thereon, means for repeatedly deflecting both of said electron beams in a first direction upon said screen substantially in predetermined phase relation to the movement of said spectrum in said given direction, means for simultaneously deflecting one of said electron beams in a different predetermined direction upon said screen in accordance with the varying strength of said amplified electrical signal, means for deflecting the other of said electron beams a preselected amount in said different predetermined direction upon said viewing screen each time said spectrum is moved predetermined fractional amounts of its total movement across said exit slit, adjustable electrical means operatively connected to said supporting means for said entrance slits for varying in a series of steps the band width of said amplifying means in accordance with the particular entrance slit located in said operative position, and rapidly operating opaque means positioned in said apparatus so as to periodically prevent the transmission of said radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity at high resolution in accordance with the entrance slit being employed will be provided upon said viewing screen.

10. Spectrographic apparatus for displaying substantially instantaneous changes in the spectral distribution characteristics of radiant energy coming from a radiant energy source to be analyzed, said apparatus comprising a normally stationary entrance slit for admitting said radiant energy to be analyzed to said apparatus, stationary means for forming a spectrum of said energy, a plurality of exit slits of different predetermined widths, movable supporting means for selectively positioning any one of said exit slits in an operative position, oscillating means for repeatedly moving said spectrum in a given direction across the exit slit disposed in said operative position substantially at a relatively large predetermined number of times per second, electrical means including a photosensitive element operatively positioned to receive the portion of the radiant energy passing through the exit slit in said operative position, amplifying means providing an amplified electrical signal which varies in strength in accordance with the amount of radiant energy being received by said element, a cathode ray tube having a viewing screen and means for projecting two electron beams simultaneously thereon, means for repeatedly deflecting both of said electron beams in a first direction upon said screen substantially in predetermined phase relation to the movement of said spectrum in said given direction, means for simutaneously deflecting one of said electron beams in a different predetermined direction upon said screen in accordance with the varying strength of said amplified electrical signal, means for deflecting the other of said electron beams a preselected amount in said different predetermined direction upon said viewing screen each time said spectrum is moved predetermined fractional amounts of its total movement across said exit slit, adjustable electrical means operatively connected to said supporting means for said exit slits for varying in a series of steps the band width of said amplifying means in accordance with the particular exit slit located in said operative position, and rapidly operating opaque means positioned in said apparatus so as to periodically prevent the transmission of said radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity at high resolution in accordance with the exit slit being employed will be provided upon said viewing screen.

11. Spectrographic apparatus for displaying substantially instantaneous changes in the spectral distribution characteristics of radiant energy coming from a radiant energy source to be analyzed, said apparatus comprising a plurality of entrance slits of different predetermined widths, first movable supporting means for selectively positioning any one of said entrance slits in an operative position for admitting said radiant energy to be analyzed to said apparatus, stationary means for forming a spectrum of said energy, a plurality of exit slits of different predetermined widths, second movable supporting means for selectively positioning any one of said exit slits in a second operative position, oscillating means for repeatedly moving said spectrum in a given direction across the exit slit disposed in said second operative position substantially at a relatively large predetermined number of times per second, electrical means including a photosensitive element operatively positioned to receive the portion of said radiant energy passing through the exit slit in said second operative position, amplifying means for providing an amplified electrical signal which varies in strength in accordance with the amount of radiant energy being received by said element, a cathode ray tube having a viewing screen and means for producing two electron beams simultaneously thereon, means for repeatedly deflecting both of said electron beams in a first direction upon said screen substantially in predetermined phase relation to the movement of said spectrum in said given direction, means for simultaneously deflecting one of said electron beams in a different predetermined direction upon said screen in accordance with the varying strength of said amplified electrical signal, means for deflecting the other of said electron beams a preselected amount in said different preterminned direction upon said viewing screen each time said spectrum is moved predetermined fractional amounts of its total movement across said exit slit, adjustable electrical means operatively connected to said first and second supporting means for varying in a series of steps the band width of said amplifying means in accordance with the particular combination of entrance and exit slits located in said first and second operative positions respectively, and rapidly operating opaque means positioned in said apparatus so as to periodically prevent the transmission of said radiant energy to said photosensitive element and arranged to operate in predetermined phase relation to said movement of said spectrum across said exit slit in said given direction, whereby a luminous trace indicative of the relative intensities of different wave lengths of the spectrum of the radiant energy entering said apparatus relative to a zero intensity at high resolution in accordance with the selected combination of slits being employed will be provided upon said viewing screen.

12. Spectographic apparatus for displaying substantially instantaneous changes in the spectral distribution characteristics of radiant energy coming from a radiant energy source to be analyzed, said apparatus comprising a normally stationary entrance slit for admitting said radiant energy to be analyzed to said apparatus, stationary prism means for forming a spectrum of said energy comprehending substantially wave lengths between 10,000 angstrom units and 2.8 microns, a normally stationary exit slit, oscillating means for repeatedly moving said spectrum in a given direction across said exit slit substantially at a relatively large predetermined number of times per second, electrical means including an infrared sensitive photoconducting element operatively positioned to receive the portion of said radiant energy passing through said exit slit and provide an electrical signal which varies in strength in accordance with the amount of radiant energy being received thereby, said photoconductor being connected in series in a peaking circuit producing an A. C. current so as to have said signal superimposed thereon, coupling and amplifying means for amplifying said signal, a cathode ray tube having a viewing screen, means for deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, and rapidly operating opaque means positioned in said apparatus so as to periodically prevent the transmission of radiant energy to said photosensitive element and arranged to operate in predetermined phase relation to said movement of said spectrum in said given direction across said exit slit, whereby a luminous trace indicative of the relative intensities of different wave lengths of the spectrum of the radiant energy entering said apparatus relative to a zero intensity will be provided upon said viewing screen.

13. The combination as recited in claim 12 and in which said coupling and amplifying means includes a preamplifier tube having a filament for heating said tube and a cathode adjacent but electrically insulated therefrom, conductive means connected to said cathode for biasing said cathode negatively with respect to said filament to such an extent that secondary A. C. signals due to stray electrons, or the like, leaking across the insulation between said filament and said cathode will be eliminated.

14. Spectographic apparatus for displaying substantially instantaneous changes in the spectral distribution characteristics of radiant energy coming from a radiant energy source to be analyzed, said apparatus comprising a plurality of entrance slits of different predetermined widths, movable supporting means for selectively positioning any one of said entrance slits in an operative position for admitting said radiant energy to be analyzed to said apparatus, stationary means for forming a spectrum of said energy, an exit slit, oscillating means for repeatedly moving said spectrum in a given direction across said exit slit substantially at a relatively large predetermined number of times per second, electrical means including a photosensitive conducting element operatively positioned to receive the portion of said radiant energy passing through said exit slit and coupling, and amplifying means for providing an amplified electrical signal which varies in strength in accordance with the amount of radiant energy being received by said conducting element, said conducting element being connected in series in a peaking circuit producing an A. C. current so as to have said amplified signal superimposed thereon, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, adjustable electrical means for varying in a series of steps the band width of said amplifying means, coupling means interconnecting said supporting means for said entrance slits and said means for varying said band width so as to be operated simultaneously to corresponding preselected positions, said coupling and amplifying means includes a preamplifier tube having a filament for heating said tube and a cathode adjacent but electrically insulated therefrom, conductive means connected to said cathode for biasing said cathode negatively with respect to said filament to such an extent that secondary A. C. signals due to stray electrons, or the like, leaking across the insulation between said filament and said cathode will be eliminated, whereby a luminous trace indicative of the relative intensities of different wave lengths of the spectrum of the radiant energy entering said apparatus at high optical and electrical resolution in accordance with the amount of radiant energy available from the particular source being analyzed will be provided upon said viewing screen.

15. Spectrographic apparatus for displaying substantially instantaneous changes in the spectral distribution characteristics of radiant energy coming from a radiant energy source to be analyzed, said apparatus comprising a plurality of entrance slits of different predetermined widths, first movable supporting means for selectively positioning any one of said entrance slits in an operative position for admitting said radiant energy to be analyzed to said apparatus, stationary means for forming a spectrum thereof, a plurality of exit slits of different predetermined widths, second movable supporting means for selectively positioning any one of said exit slits in a second operative position, oscillating means for repeatedly moving said spectrum in a given direction across the exit slit disposed in said second operative position substantially at a relatively large predetermined number of times per second, electrical means including a photosensitive conducting element operatively positioned to receive the portion of said radiant energy passing through the exit slit in said second operative position and coupling and amplifying means for providing an amplified electrical signal which varies in strength in accordance with the amount of radiant energy being received by said conducting element, said conducting element being connected in series in a peaking circuit producing an A. C. current so as to have said amplified signal superimposed thereon, a cathode ray tube having a viewing screen, means for repeatedly deflecting an electron beam of said tube in a first direction upon said screen substantially in predetermined phase relation to the movement of said spectrum in said given direction, means for simultaneously deflecting said electron beam in a different predetermined direction upon said screen in accordance with the varying strength of said amplified electrical signal, adjustable electrical means for varying in a series of steps the band width of said amplifying means, coupling means interconnecting said supporting means for said entrance slits and for said exit slits and said means for varying said band width so as to be operated simultaneously to corresponding preselected positions, said coupling and amplifying means includes a preamplifier tube having a filament for heating said tube and a cathode adjacent but electrically insulated therefrom, conductive means connected to said cathode for biasing said cathode negatively with respect to said filament to such an extent that secondary A. C. signals due to stray electrons, or the like, leaking across the insulation between said filament and said cathode will be eliminated, whereby a luminous trace indicative of the relative intensities of different wave lengths of the spectrum of the radiant energy entering said apparatus at high optical and electrical resolution in accordance with the amount of radiant energy available from the particular source being analyzed will be provided upon said viewing screen.

References Cited in the file of this patent

UNITED STATES PATENTS 2,078,768    Meier  ---------------- Apr. 27, 1937

(Other references on following page)

UNITED STATES PATENTS

| | | |
|---|---|---|
| 2,193,606 | Ulrey | Mar. 12, 1940 |
| 2,240,722 | Snow | May 6, 1941 |
| 2,287,322 | Nelson | June 23, 1942 |
| 2,339,754 | Brace | Jan. 25, 1944 |
| 2,413,080 | Seeley | Dec. 24, 1946 |
| 2,437,323 | Heigl et al. | Mar. 9, 1948 |
| 2,444,560 | Feldt | July 6, 1948 |
| 2,515,762 | Dimmick | July 18, 1950 |
| 2,597,001 | Jaffe | May 20, 1952 |
| 2,630,736 | Beitz | Mar. 10, 1953 |
| 2,631,489 | Golay | Mar. 17, 1953 |
| 2,650,307 | Koppins | Aug. 25, 1953 |
| 2,723,589 | Bullock et al. | Nov. 15, 1955 |
| 2,750,834 | Golay | June 19, 1956 |